UNITED STATES PATENT OFFICE.

S. W. KIRK, OF COATESVILLE, PENNSYLVANIA, ASSIGNOR TO HIMSELF AND E. C. STOTSENBERG, OF WILMINGTON, DELAWARE.

IMPROVEMENT IN PURIFYING CAST-IRON.

Specification forming part of Letters Patent No. 38,003, dated March 24, 1863.

*To all whom it may concern:*

Be it known that I, S. W. KIRK, of Coatesville, in the county of Chester, in the State of Pennsylvania, have discovered a new and Improved Process of Purifying and Strengthening Iron; and I do hereby declare that the following is a full and exact description thereof.

The nature of my discovery consists in using binoxide or hyperoxide black manganese with or without the sesquioxide of iron.

To enable others to make use of my discovery, I will proceed to describe the manner of using the material.

The black oxide of manganese is ground fine, mixed with water or a saturated solution of the carbonate of soda and made into a paste the consistency of dough, with which the ladle, basin, or other receptacle is lined on the bottom and sides, into which the iron in its fluid state is poured or run, or it may be used in any other way most convenient for the mass of metal to be operated on, when the heat of the iron will liberate the oxygen contained in the manganese, which unites with a portion of the carbon contained in the iron and passes off as carbonic-acid gas. After the iron has boiled with considerable energy for a time, caused by the escaping gas, the manganese will unite with the silica and other impurities that the iron contains, forming a slag which rises to the top of the metal, leaving the iron comparatively pure and of great strength.

The amount of the material to be used cannot be stated in all cases, as that will depend entirely upon the quality of the iron to be operated upon. Therefore I do not wish to limit myself to any amount, but in most cases from two and a half to five per cent. will be found amply sufficient, and in cases where the sesquioxide of iron and manganese are used from three-fourths of one per cent. to one and a half per cent. of each is used.

I wish it distinctly understood I do not claim the addition of manganese to iron as an alloy, as used by Mr. Morris Sterling, of England, and described in a work on metallurgy by Overman, which is of doubtful utility; nor do I claim the presence of the carburet of manganese in iron or steel, as patented by a Mr. Heath, of England; nor do I claim its presence in the puddling-furnace mixed with salt at the time iron is coming to nature, as it has been used before in that way; but What I do claim, and desire to secure by Letters Patent, is—

The use of the binoxide or hyperoxide black manganese, with or without the addition of the sesquioxide of iron, introduced to the iron when the iron is perfectly fluid for the purpose of washing out the impurities, substantially in the manner and for the purpose set forth.

S. W. KIRK.

Witnesses:
JOHN STONE,
EDW. WORTH.